US012619864B2

(12) United States Patent
Boonstra

(10) Patent No.: US 12,619,864 B2
(45) Date of Patent: May 5, 2026

(54) EFFICIENT LOOK-UP TABLE BASED FUNCTIONS FOR ARTIFICIAL INTELLIGENCE (AI) ACCELERATOR

(71) Applicant: Synopsys, Inc., Sunnyvale, CA (US)

(72) Inventor: Johannes Boonstra, Deurne (NL)

(73) Assignee: SYNOPSYS, INC., Sunnyvale, CA (US)

( * ) Notice: Subject to any disclaimer, the term of this patent is extended or adjusted under 35 U.S.C. 154(b) by 884 days.

(21) Appl. No.: 17/825,868

(22) Filed: May 26, 2022

(65) Prior Publication Data

US 2024/0005138 A1    Jan. 4, 2024

(51) Int. Cl.
| | |
|---|---|
| *G06N 3/06* | (2006.01) |
| *G06F 7/499* | (2006.01) |
| *G06F 9/30* | (2018.01) |
| *G06F 9/355* | (2018.01) |
| *G06N 3/065* | (2023.01) |

(52) U.S. Cl.
CPC ......... *G06N 3/065* (2023.01); *G06F 7/49942* (2013.01); *G06F 9/3001* (2013.01); *G06F 9/3555* (2013.01)

(58) Field of Classification Search
None
See application file for complete search history.

(56) References Cited

U.S. PATENT DOCUMENTS

| | | | | |
|---|---|---|---|---|
| 11,038,520 B1 * | 6/2021 | Narayanan | .......... | H03M 1/1019 |
| 11,423,313 B1 * | 8/2022 | Diamant | ................ | G06N 3/045 |
| 11,468,147 B1 * | 10/2022 | Hofer | ..................... | G06N 3/084 |
| 2018/0060278 A1 * | 3/2018 | Lin | .......................... | G06N 3/048 |
| 2019/0147323 A1 * | 5/2019 | Li | ........................... | G06N 3/048 |
| | | | | 706/15 |
| 2021/0397596 A1 * | 12/2021 | Antony | .................. | G06N 3/063 |

(Continued)

FOREIGN PATENT DOCUMENTS

| | | |
|---|---|---|
| EP | 3 961 514 A1 | 3/2022 |

OTHER PUBLICATIONS

Bonnot, Justine, Daniel Menard, and Erwan Nogues. "New Type of Non-Uniform Segmentation for Software Function Evaluation." Application-specific Systems, Architectures and Processors. 2016. (Year: 2016).*

(Continued)

*Primary Examiner* — Hal Schnee
(74) *Attorney, Agent, or Firm* — WOMBLE BOND DICKINSON (US) LLP

(57) ABSTRACT

A method for approximating an activation function, the method including: receiving an input value of the activation function; determining that the input value is within a range, the range includes a set of non-uniform intervals; determining a selected interval from among the set of non-uniform intervals including the input value; retrieving, by a hardware accelerator, from a look-up table (LUT) associated with a type of the activation function, values of one or more quadratic interpolation parameters associated with the selected interval; performing a quadratic interpolation on the input value to approximate the input value using the values of the one or more quadratic interpolation parameters; and determining a first approximated output of the activation function based on a result of the quadratic interpolation performed on the input value.

20 Claims, 9 Drawing Sheets

Example LUT Interpolation: tanh

Linear interpolation
Negative linear range:[-inf, -8)    quantized as
[0x80000000, 0xffff7fff]
y = 0 * x + -1

Quadratic interpolation

[-8,8)    quantized as:
[0xffff8000, 0x0008000)

Linear interpolation
Positive linear range:
[8, +inf] quantized as
[0x00008000,0x7fffffff]
y = 0 * x + 1

(56)                    References Cited

U.S. PATENT DOCUMENTS

| | | | |
|---|---|---|---|
| 2022/0066737 A1* | 3/2022 | Mu ......................... | G06F 7/548 |
| 2023/0237307 A1* | 7/2023 | Hsu ........................ | G06N 3/048 |
| | | | 706/27 |

OTHER PUBLICATIONS

Pineiro, J. A. et al., "High-Speed Function Approximation Using a Minimax Quadratic Interpolator," IEEE Transactions on Computers, IEEE, USA, vol. 54, No. 3, Mar. 2005, 16 pages.

* cited by examiner

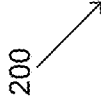

FIG. 2

START

RECEIVE AN INPUT
210

IS THE INPUT VALUE WITHIN THE QUADRATIC INTERPOLATION INTERVAL?
215

NO

DETERMINE OFFSET VALUES AND GRADIENT OR SLOPES OF THE ACTIVATION FUNCTION OUTSIDE THE QUADRATIC INTERPOLATION RANGES
235

PERFORM LINEAR INTERPOLATION OF THE INPUT
240

YES

DETERMINE THE INTERVAL FROM AMONG THE SET OF INTERVALS THAT INCLUDES THE VALUE OF THE INPUT X
220

THE VALUE OF a, b, c, ARE RETRIEVED FROM A LUT
225

PERFORM QUADRATIC INTERPOLATION OF THE INPUT
230

Determine the output
245

END

200

Example LUT Interpolation: tanh

Linear interpolation
Positive linear range:
[8, +inf] quantized as
[0x00008000,0x7fffffff]
y = 0 * x + 1

Quadratic interpolation

[-8,8) quantized as:
[0xffff8000, 0x0008000)

Linear interpolation
Negative linear range:[-
inf, -8) quantized as
[0x80000000, 0xffff7fff]
y = 0 * x + -1

Example LUT Interpolation: sigmoid

Linear interpolation
Negative linear range:[-inf, -16) quantized as:
[0x80000000, 0xffff7fff]
y = 0 * x + -1

Quadratic interpolation
[-16,16) quantized as[0xffff8000, 0x00008000)

Linear interpolation
Positive linear range:
[16, +inf] quantized as
[0x00008000,0x7fffffff]
y = 0 * x + 1

Example LUT Interpolation: swish

Linear interpolation
Positive linear range:
[3, +inf] quantized as
[0x00003000,0x7fffffff]
    y = slope$_{pos}$ * x + 0

Quadratic interpolation
[-5,3)      quantized
        as:
[0xfffffb000, 0x0003000)

Linear interpolation
Negative linear range:[-
inf, -5) quantized as:
[0x80000000, 0xfffffafff]
y = 0 * x + 0

EFFICIENT LOOK-UP TABLE BASED FUNCTIONS FOR ARTIFICIAL INTELLIGENCE (AI) ACCELERATOR

TECHNICAL FIELD

The present application generally relates to an artificial intelligence (AI) accelerator system. More particularly, the present disclosure relates to a system and method for providing an efficient look-up table based function for an AI accelerator.

BACKGROUND

An artificial intelligence (AI) and/or machine learning (ML) accelerator is a high-performance parallel computation machine that is specifically designed for the efficient processing of AI workloads like neural networks. Given that processing speed and scalability are two key demands from AI applications, AI accelerators (e.g., a neural network processing unit) play a critical role in delivering the near-instantaneous results that make these applications valuable.

The above information in the Background section is only for enhancement of understanding of the background of the technology and therefore it should not be construed as admission of existence or relevancy of the prior art.

SUMMARY

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

In one or more embodiments, a method for approximating an activation function includes: receiving an input value of the activation function; determining that the input value is within a range, the range includes a set of non-uniform intervals; determining a selected interval from among the set of non-uniform intervals including the input value; retrieving, by a hardware accelerator, from a look-up table (LUT) associated with a type of the activation function, values of one or more quadratic interpolation parameters associated with the selected interval; performing a quadratic interpolation on the input value to approximate the input value using the values of the one or more quadratic interpolation parameters; and determining a first approximated output of the activation function based on a result of the quadratic interpolation performed on the input value.

In one or more embodiments, a Remez minimax algorithm is used to determine a non-uniform distribution of the set of non-uniform intervals. In one or more embodiments, the determining the selected interval from among the set of non-uniform intervals is based on one or more of most significant bits (MSB) of the input value and/or two's complement encoded input value. In one or more embodiments, the LUT associated with the activation function includes the values of the one or more quadratic interpolation parameters for each interval from among the set of non-uniform intervals. In one or more embodiments, the hardware accelerator stores a plurality of LUTs including parameters associated with quadratic interpolation ranges of a plurality of activation functions.

In one or more embodiments, the plurality of LUTs are implemented as flip-flops in the hardware accelerator. In one or more embodiments, method further includes: determining, by the hardware accelerator, that the input value is within one or more linear extrapolation ranges, the one or more linear extrapolation ranges do not overlap with the range; determining, by the hardware accelerator, offset values and slopes of the activation function for each of the one or more linear extrapolation ranges; performing, by the hardware accelerator, a linear extrapolation on the input value to approximate the input value using the offset values and the slopes of the activation function for each of the one or more linear extrapolation ranges; and determining, by the hardware accelerator, a second approximated output of the activation function based on a result of the linear extrapolation performed on the input value. In one or more embodiments, the input value is shifted by power of two factors within a range of representable values in a fixed point representation of the second approximated output of the activation function.

In one or more embodiments, a system for approximating an activation function includes: a bit shifter configured to receive an input value of the activation function and perform a shift operation on the input value to compute most significant bits (MSBs) of the input value; a first device configured to determine if the input value is within a range including a set of non-uniform intervals, and determine a selected interval from among the set of non-uniform intervals including the input value based on the MSBs of the input value; a second device configured to retrieve from a look-up table (LUT) associated with the activation function, values of one or more quadratic interpolation parameters associated with the selected interval; one or more multiply-accumulate-scale circuits configured to perform a quadratic interpolation on the input value to approximate the input value using the values of the one or more quadratic interpolation parameters, and to determine a first approximated output of the activation function based on a result of the quadratic interpolation performed on the input value.

In one or more embodiments, the system includes a hardware accelerator and/or an electronic circuit configured by a hard macro intellectual property (IP). In one or more embodiments, the hardware accelerator stores a plurality of LUTs including parameters associated with quadratic interpolation ranges of a plurality of activation functions. In one or more embodiments, the plurality of LUTs are implemented as flip-flops in the hardware accelerator. In one or more embodiments, Remez minimax algorithm is used to determine non-uniform distribution of the set of non-uniform intervals.

In one or more embodiments, the determining the selected interval from set of non-uniform intervals is based on one or more of most significant bits (MSB) of the input value and two's complement encoded input value. In one or more embodiments, the LUT associated with the activation function includes the values of quadratic interpolation parameters for each interval from among the set of non-uniform intervals.

In one or more embodiments, the system further includes: a third device configured to determine offset values and slopes of the activation function for each of one or more linear extrapolation ranges based on the first device determining that the input value is within the one or more linear extrapolation ranges, the one or more linear extrapolation ranges do not overlap with the range, wherein the one or more multiply-accumulate-scale circuits are further configured to perform a linear extrapolation on the input value to approximate the input value using the offset values and the slopes of the activation function for each of the one or more linear extrapolation ranges, and to determine a second approximated output of the activation function based on a result of the linear extrapolation performed on the input value. In one or more embodiments, the input value is shifted by power of two factors within a range of representable values in a fixed point representation of the second approximated output of the activation function.

In one or more embodiments, a non-transitory computer readable medium including stored representation of an accelerator circuit, which when synthesized by a processor, cause the processor to synthesize a structure of an electronic circuit configured to: receive an input value of an activation function; determine that the input value is within a range, the range includes a set of non-uniform intervals; determine a selected interval from among the set of non-uniform intervals including the input value; retrieve from a look-up table (LUT) associated with the activation function, values of one or more quadratic interpolation parameters associated with the selected interval; perform a quadratic interpolation on the input value to approximate the input value using the values of the one or more quadratic interpolation parameters; and determine a first approximated output of the activation function based on a result of the quadratic interpolation performed on the input value.

In one or more embodiments, the input value is shifted by power of two factors within a range of representable values in a fixed point representation of the first approximated output of the activation function. In one or more embodiments, the electronic circuit is further configured to: determine that the input value is within one or more linear extrapolation ranges, the one or more linear extrapolation ranges do not overlap with the range; determine offset values and slopes of the activation function for each of the one or more linear extrapolation ranges; perform a linear extrapolation on the input value to approximate the input value using the offset values and the slopes of the activation function for each of the one or more linear extrapolation ranges; and determine a second approximated output of the activation function based on a result of the linear extrapolation performed on the input value.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 2 illustrates a piece-wise approximation method of activation functions for an AI accelerator according to one embodiment of the disclosure.

FIGS. 3A-3B illustrate a function in an AI accelerator (e.g., a neural network processing unit) to perform the present piece-wise approximation method discussed with respect to FIG. 2.

DETAILED DESCRIPTION

Figure 1:
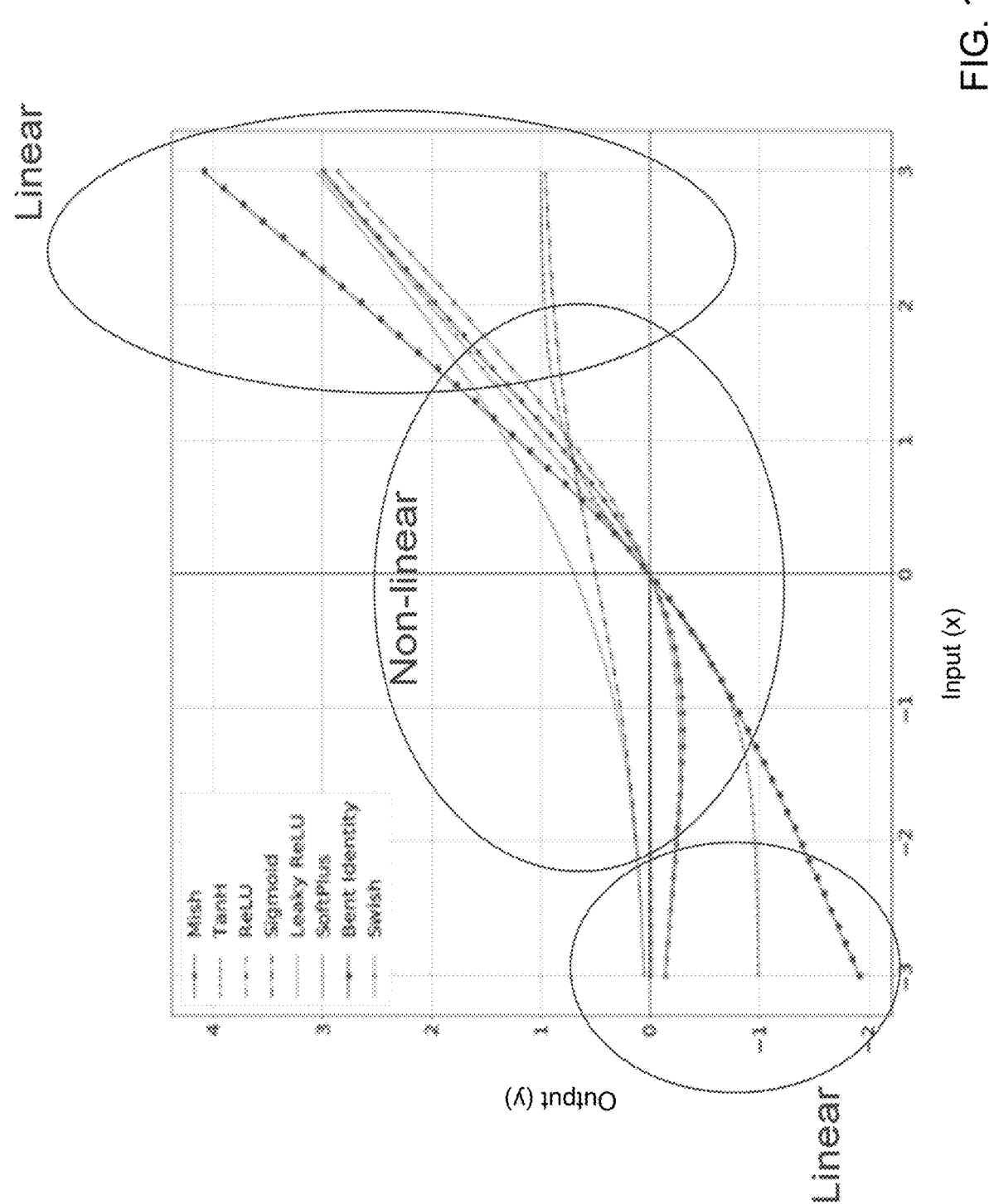
FIG. 1 illustrates different non-linear activation functions used in AI or ML.

Aspects of the present disclosure relate to a system and method for providing efficient look-up table based functions for an artificial intelligence (AI) accelerator.

An artificial intelligence (AI) and/or machine learning (ML) accelerator (e.g., a neural network processing unit) is a high-performance parallel computation machine that is specifically designed for the efficient processing of AI workloads like neural networks. Given that processing speed and scalability are two key demands from AI applications, AI accelerators play a critical role in delivering the near-instantaneous results that make these applications valuable. AI accelerators can be 100-1,000 times more efficient than general-purpose compute machines. Because of the high speed in computing data that AI accelerators offer, AI accelerators lower the latency of the time that it takes to come up with an answer. This low latency is especially important in safety-critical applications like advanced driver assistance systems (ADAS), where every second counts. AI accelerators make it possible to achieve a level of performance speed enhancement that can be almost equal to the number of cores involved. The heterogeneous architecture of the AI accelerator accommodates multiple specialized processors to support specific tasks, providing the computational performance that AI applications demand.

There are currently two distinct AI accelerator spaces, namely, the data center and the edge. Data centers, particularly hyperscale data centers, require massively scalable compute architectures. By delivering more compute, memory, and communication bandwidth, an AI accelerator in data centers can support AI research at dramatically faster speeds and scalability compared with other architectures. The edge represents the other end of the spectrum. Here, energy efficiency is the key and the real estate is limited, as the intelligence is distributed at the edge of the network rather than a more centralized location. AI accelerator intellectual property (IP) is integrated into edge system-on-chip (SoC) devices which, no matter how small, deliver the near-instantaneous results needed for, e.g., interactive programs that run on smartphones or for industrial robotics.

State-of-the-art artificial intelligence (AI) and/or machine learning (ML) applications rely on various types of non-linear activation functions (e.g., ReLU, Sigmoid, Tan h, Swish, and the like). In a neural network, an activation function may be configured to determine if a neuron of the neural network should be activated. For example, the activation function of a neural network may determine whether the neuron's input to the neural network is required for an operation by the neural network. For example, the activation function may derive output from a set of input values fed to a node (or a layer) of a neural network. In some cases, these non-linear activation functions exhibit non-linear behavior in a limited range and linear behavior outside the limited range. For example, for input values less than −8, the tan h function returns (e.g., possibly quantized) values close to −1, and for input values greater than +8, the tan h function returns (e.g., possibly quantized) values close to +1. However, for input values in the range [−8,8], the tan h function exhibits non-linear behavior, which is strongest around 0. Therefore, tan h may be linear for input values less than −8 and input values more than +8, however, for the limited range of input values between [−8,8], tan h may be non-linear.

For example, FIG. 1 illustrates different types of non-linear activation functions (e.g., Mish, Tan h, ReLU, Sigmoid, Leaky ReLU, SoftPlus, Bent Identity, and Swish) used in AI or ML that exhibit non-linear behavior in a limited range and linear behavior outside the limited range. The linear and non-linear portions of the activation functions (e.g., Mish, Tan h, ReLU, Sigmoid, Leaky ReLU, SoftPlus, Bent Identity, and Swish) are also identified in FIG. 1. As shown in FIG. 1, the non-linear activation functions (e.g., Mish, Tan h, ReLU, Sigmoid, Leaky ReLU, SoftPlus, Bent Identity, and Swish) shown in FIG. 1 exhibit non-linear behavior for a limited range and the non-linear behavior of the activation functions may be strongest around 0 crossing. However, the non-linear activation functions (e.g., Mish, Tan h, ReLU, Sigmoid, Leaky ReLU, SoftPlus, Bent Identity, and Swish) shown in FIG. 1 exhibit linear behavior towards negative infinity and positive infinity outside the limited range where they exhibit non-linear behavior.

The set of activation functions in AI is not limited to the set depicted in FIG. 1 and will be growing over time. All these activation function approximate a linear function for large negative values and positive values, as illustrated by the left and right ellipses in FIG. 1. For example, tan h(x) will converge to +1 for large positive input values and −1 for negative input values towards negative infinity; the swish(x) function will converge to a*x (e.g., "x" is an input and "a" is a constant (e.g., a real number or a complex number)) for large positive values and 0 for negative input values towards-infinity. However, around input value 0 (or some other input value) these functions exhibit non-linear behavior, as depicted by the middle ellipse in the diagram. Non-linearity of these functions may be stronger in some intervals than in other intervals.

The AI and/or ML interference hardware accelerators require efficient approximation of non-linear activation functions that exhibit non-linear behavior in a limited range and linear behavior outside the limited range, to save silicon area, while maintaining high accuracy and operating frequency. In AI and/or ML applications, an AI accelerator may use different activation functions based on the application. The activation functions used in AI or ML applications may be differentiable activation functions to enable gradient descent training approaches for computing the parameters of the AI or ML models based on training data. Flexibility in the AI accelerator architecture may be required to make use of new activation functions that emerge over time. Differentiable activation functions may also make possible to have high throughput in AI accelerators (e.g., because gradient descent is easier to perform when using differentiable activation functions).

One or more embodiments of the present disclosure use a combination of reprogrammable, non-uniform piece-wise quadratic and linear approximation to approximate activation functions for AI/ML applications. In other words, one or more embodiments of the present disclosure describe a piece-wise approximation method of the activation functions for AI/ML. In the present approximation method, quadratic interpolation is used to approximate the region or the interval (e.g., a non-linear interval) of the activation function that exhibit non-linear behavior, linear extrapolation is used for input values less than the smallest interval boundary and for input values greater than the largest interval boundary.

In the present approximation method, the quadratic interpolation is used along with a look-up table (LUT) for fast and efficient calculation. In order to perform the quadratic interpolation to approximate the non-linear region of the activation function, the non-linear interval of the activation function is divided into non-uniform intervals to ensure limited look-up table sizes and efficient software and hardware implementation, as LUT may store the interpolation coefficient values for each of the limit values of the non-uniform intervals.

In one or more embodiments of the present disclosure, the piece-wise approximation technique may be implemented in a semiconductor intellectual property core (SIP core) or an IP core or in hardware as a hard macro IP or netlist IP, where intervals and interpolation coefficients for the quadratic interpolation may be stored in a lookup table (LUT), where the LUT may store intervals and interpolation coefficients corresponding to multiple different functions, and may also be reprogrammed to support multiple additional functions while sharing a single hardware implementation. In such a case, high accuracy is achieved for quantized inputs and outputs, and reprogrammable tables may be complemented by commonly used tables fixed in hardware of the IP core or hard macro IP or netlist IP. For example, an AI accelerator may be configured with the IP core or hard macro IP incorporating the present piece-wise approximation technique to approximate non-linear region of the activation functions for AI and/or ML.

In one or more embodiments, the piece-wise approximation method of the present disclosure may offer an efficient solution to the traditional approximation methods of the activation functions used in AI/ML by reducing the amount of calculation required in traditional approximation methods by performing quadratic interpolation in the region or the interval of the activation function that exhibit non-linear behavior, and using linear extrapolation elsewhere.

The piece-wise approximation method of the present disclosure may be implemented in hardware as a hard macro IP or netlist IP (e.g., in edge inference engines), and may occupy a small silicon area and offer high throughput. The LUTs that are used for quadratic interpolation in the piece-wise approximation method of the present disclosure are small in size and therefore may be implemented as flip-flops, enabling single instruction, multiple data (SIMD) execution of the activation function computation. The implementation of the piece-wise approximation method of the present disclosure may be flexible because the LUTs may be reprogrammable using software. Further, if required by the activation function, continuity of the first order derivative can be guaranteed by using piece-wise quadratic interpolation, so, gradient decent training of the AI/ML may be possible. Also, the non-uniform distribution of interpolation intervals that is used in the present piece-wise approximation method may ensure a high accuracy of the activation function output. Moreover, the piece-wise approximation method of the present disclosure may be used to approximate functions other than activation functions of a neural network.

FIG. 2 illustrates a piece-wise approximation method of activation functions of neural network for an AI accelerator, according to one embodiment of the disclosure.

In the method of FIG. 2, at 210, an input value x is received.

Next at 215, an AI accelerator (e.g., a hardware accelerator) or a hard macro IP (e.g., an electronic circuit configured by a hard macro (IP)) incorporating the present piece-wise approximation method 200 may determine if the input value x is within a quadratic interpolation range. In other words, at 215, an AI accelerator or a hard macro IP incorporating the present piece-wise approximation method 200 may determine if the input value x is within the boundaries of a set of intervals I during which the activation function exhibits non-linear behavior.

For example, if it is assumed that there is the set of intervals I and a set of associated limit values L: $\{l_0, l_1, \ldots, l_N\}$, for an input x of the activation function, quadratic interpolation will be performed in an interval i if:

$$\exists\, i, i \in I | l_i \leq x \leq l_{i+1} \qquad (1)$$

In other words, the quadratic interpolation is performed to approximate the input x using the parameters of interval i if the input value x is within the boundaries of the set of intervals I, exclusive the right boundary (e.g., $l_0 \leq x < l_{N-1}$) (for example, for each non-uniform interval, the right boundary is included in the next interval, however, an input value cannot be included in two intervals). Otherwise, linear interpolation is performed to approximate the input x (e.g., for $x < l_0$ and for $x \geq l_{N-1}$).

In one or more embodiments, the set of intervals I may be the intervals during which the activation function exhibits non-linear behavior. In one or more embodiments, it may be assumed that the set of intervals I incorporates a set of non-uniform intervals, where i represents an interval in the set of intervals I.

In one or more embodiments, in order to determine the set of intervals I, the linear and non-linear regions of the activation function may be identified and associated limit values for linear and non-linear regions of the activation function are defined.

If at 215, it is determined that the input value x is within the boundaries of the set of intervals I, exclusive the right boundary, at 220, the AI accelerator or the hard macro IP may determine the interval i from among the set of intervals I that includes the value of the input x.

For an interval i in the set of intervals I, quadratic interpolation of input x is based on the expression:

$$y = a_i + b_i x + c_i x^2 \qquad (2)$$

In other words, quadratic interpolation in interval i is characterized by the parameters $a_i$, $b_i$, $c_i$.

Next, at 225, the value of the parameters $a_i$, $b_i$, $c_i$ associated with the interval i that includes the input x (or input key x) are retrieved from a LUT associated with the input activation function (e.g., a LUT associated with a type of the input activation function). The LUT associated with the type of input activation function incorporates the value of the parameters $a_i$, $b_i$, $c_i$ for each interval i in the set of intervals I. In the LUT, i may also indicate the index of the LUT, e.g., i=lookup (x). The LUT associated with the activation function may be stored in the AI accelerator or a hard macro IP.

In one or more embodiments, one or more memory devices in the AI accelerator or the hard macro IP may store a plurality of LUTs including the coefficients for quadratic interpolation for the non-linear regions of the different activation functions. In one or more embodiments, a plurality of LUTs including the coefficients for quadratic interpolation for the non-linear regions of the different activation functions may be determined (e.g., manually by human analysis of the functions or by a processor) and stored in the LUT before the activation function is approximated. The values stored in the LUT may be fixed (e.g., hardcoded in the hard macro) or the macro may define a programmable LUT so that a user can later on program the LUT with limits and coefficients for approximating other functions.

In order to determine the LUT, the interval during which the activation function exhibits non-linear behavior (e.g., the set of intervals I) is divided into non-uniform intervals. For example, the set of intervals I incorporates a set of non-uniform intervals, where i represents an interval in the set of intervals I. Using non-uniform distribution of interpolation intervals ensures a uniform accuracy of the activation function output. For example, in one or more embodiments, Remez minimax algorithm may be used to determine non-uniform distribution of interpolation intervals to minimize approximation error and improve accuracy.

In one or more embodiments, the non-uniform distribution of the intervals may be based on the most significant bits (MSB) of the input quantized, e.g., twos-complement encoded input value. For example, the 6 most significant input bits can be used to define the boundaries of 16 non-uniform intervals. In one or more embodiments, each interval is characterized by a left and right limit. An approximation using N intervals requires the definition of N+1 limit values.

One or more embodiments of the present disclosure describe performing quadratic interpolation only within the non-linear region of the activation function to limit the LUT size. Limited size of the LUT may allow high-speed hardware implementation of the present piece-wise approximation technique, for example, using SIMD, limit the silicon area for storing the LUT, and lower overhead of software reconfiguring tables. Use of quadratic interpolation may also ensure that the resulting approximation is differentiable, which helps in gradient-decent training approaches in AI/ML.

Therefore, quadratic interpolation is performed on the input x using equation (2).

To reduce the approximation error in an interpolation range I, a minimax algorithm, like Remez may be used to approximate the function as represented in equation (2) using second-order Chebyshev polynomials.

The expression of equation (2) can be rewritten relative to the start of the interpolation interval oi:

$$y = a_i' + b_i'(x - o_i) + c_i(x - o_i)^2 \qquad (3)$$

The rewritten form of equation (2) which is represented in equation (3) may reduce the number of bits in the multiplications in quantized applications. In one or more embodiments, $o_i$ is the left side (e.g., the left boundary) of the interval i in which the quadratic interpolation is performed.

In one or more embodiments, $b_i' = b_i + 2 * c_i * o_i$; and $a_i' = a_i + b_i * o_i + c_i * o_i^2$ The equation (3) may be rewritten as a Horner's series to improve accuracy:

$$y = a_i' + (b_i' + c_i(x - o_i))(x - o_i) \qquad (4)$$

If it is assumed that $d = (x - o_i)$, equation (4) may be rewritten as:

$$y = a_i' + (b_i' + c_i d)d \qquad (5)$$

Quantized version of the above equation (5) may include shift operations, represented by power of two factors within a range of the representable values in a fixed point representation of the approximated output of the activation function (e.g., to ensure the intermediate and final values do not overflow and are of the desired quantization). For example, the input x and the output y are shifted by power of two factors to ensure the intermediate and final values do not overflow and are of the desired quantization. These powers of two factors ($n_i$ and $m_i$) may be quantization interval dependent and may be determined by a quantization process. Considering the shift operations represented by the powers of two factors ($n_i$ and $m_i$), equation (5) may be rewritten as:

$$y=a_i'+(b_i'+c_id2^{ni})d2^{mi} \quad (6)$$

In equation (1) to equation (6), the quadratic interpolation ranges (e.g., the set of intervals I), may be characterized by: 1) I+1 interval limit values ($o_i$), specifying the left and right boundaries of each of the interpolation intervals, 2) I offset values ($a_i$), 3) I 1st order derivative values ($b_i$), 4) I 2nd order derivative values ($c_i$), 5) optionally I 1st order shift values to ($m_i$), and 6) optionally I 2nd order shift values to ($n_i$).

Next, at 230, quadratic interpolation is performed on the input x using equation (6).

If at 215, it is determined that the input value x is outside the quadratic interpolation ranges (e.g., the set of intervals I), for example, if the input value x is in the range $[-\infty, l_0)$ or $[l_N, \infty]$, at 235, offset values $a_{min}$ and $a_{max}$ for the ranges $[-\infty, l_0)$ and $[l_N$, col and the gradient or slopes $b_{min}$ and $b_{max}$ of the activation function for the ranges $[-\infty, l_0)$ and $[l_N, \infty]$ respectively, may be determined.

Next, at 240, linear extrapolation may be performed on the input x to approximate the input x, using the equations:

$$y=a_{min}+b_{min}x \quad (7)$$

$$y=a_{max}+b_{max}x \quad (8)$$

In equations (7) and (8), min and max represent the left and right ranges. For example, equation (7) may be used to approximate x, if x is between $[-\infty, l_0)$, and equation (8) may be used to approximate x, if x is between $[l_N, \infty]$. In one or more embodiments, assuming min coincides with the left of the left most quadratic interpolation interval (e.g., $i_0$) and max coincides with the right of the right most quadratic interpolation intervals (e.g., $i_N$), the equations (7) and (8) can be rewritten as:

$$y=a_{min}'+b_{min}'(x-o_0) \quad (9)$$

$$y=a_{max}'+b_{max}'(x-o_I) \quad (10)$$

Here, $o_0$ is the left limit of the left most quadratic interpolation interval (e.g., $i_0$) and of is the right limit of the right most quadratic interpolation interval (e.g., $i_N$).

The quantized version of the above equations may be represented as:

$$y=a_{min}'+b_{min}'d2^{nmin} \quad (11)$$

$$y=a_{max}'+b_{max}'d2^{nmax} \quad (12)$$

Quantized version of the above equations (11) and (12) may include shift operations (e.g. $n_{min}$; $n_{max}$), represented by power of two factors to ensure the intermediate and final values do not overflow and are of the desired quantization. The left and right linear extrapolation ranges may be characterized by: 1) the left offset values ($a_{min}$) and 1st order derivative ($b_{min}$), 2) the right offset values ($a_{max}$) and 1st order derivative ($b_{max}$), 3) optionally the left shift value to ($n_{min}$), and 4) optionally the right shift value to ($n_{max}$).

In one or more embodiments, $a_{min}$ and $a_{max}$ may represent the offset values for the ranges $[-\infty, l_0)$ and $[l_N, \infty]$ of the input x, respectively and $b_{min}$ and $b_{max}$ may represent the gradient or slopes of the activation function for the ranges $[-\infty, l_0)$ and $[l_N, \infty]$.

At 245, the approximated output y of the activation function is determined by performing the quadratic interpolation on the input x using equation (6) or linear extrapolation on the input x using the equations (11) and (12). In one or more embodiments, the input x and the output y are shifted by power of two factors to ensure the intermediate and final values do not overflow and are of the desired quantization.

Figure 3A:
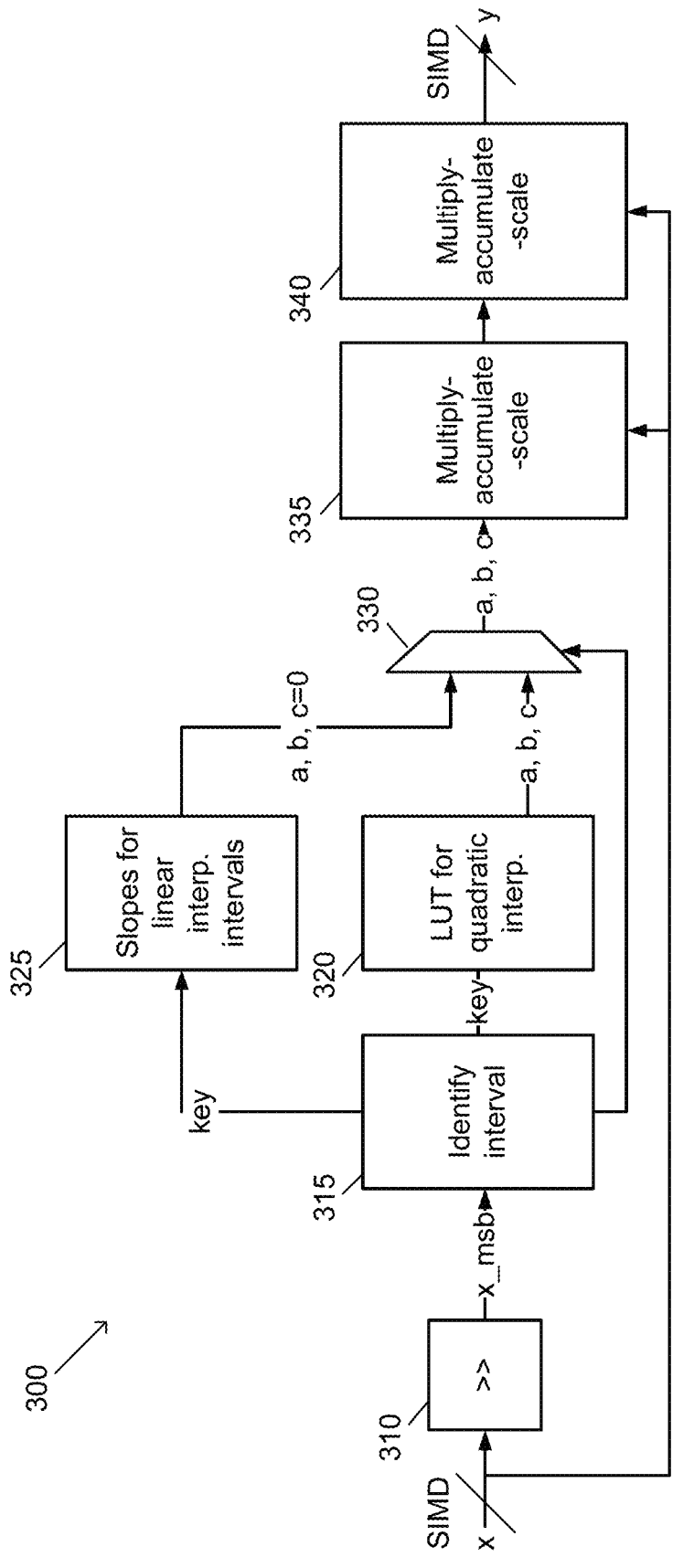
FIGS. 3A-3B illustrate an AI accelerator or an IP core to perform the present piece-wise approximation method discussed with respect to FIG. 2 according to one embodiment of the disclosure. For example.
Figure 3B:
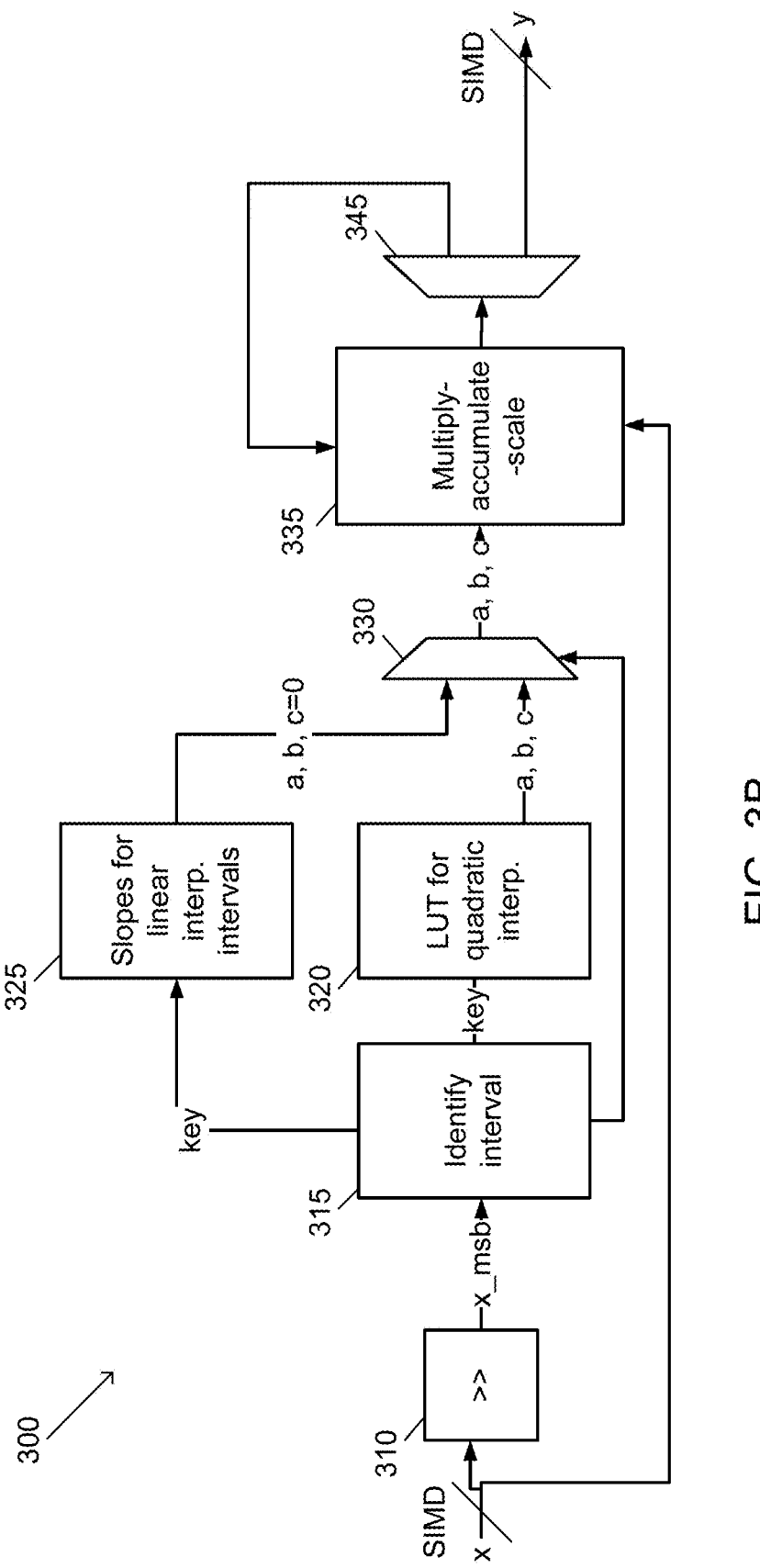

FIGS. 3A-3B illustrate an AI accelerator or an IP core to perform the present piece-wise approximation method discussed with respect to FIG. 2. For example, FIGS. 3A-3B illustrate a function in an AI accelerator (e.g., a neural network processing unit) to perform the present piece-wise approximation method discussed with respect to FIG. 2.

For example, the AI accelerator or IP core 300 includes a bit shifter 310, a device 315 for identifying the interval where the input value belongs, a device 325 for determining the slope of the input activation function in certain intervals for linear interpolation, a device 320 for storing the LUTs associated with one or more activation functions, a multiplexer 330, and two multiply-accumulate-scale devices 335 and 340. It is appreciated that the devices 315, 325, and 320 may be combined together in various combinations, without deviating from the scope of the present disclosure.

In the AI accelerator or IP core 300 of FIG. 3, when an input x is received, a bit shifting operation is performed on the input x. As discussed with respect to FIG. 2, the shift operation may be performed to ensure the intermediate and final values do not overflow and are of the desired quantization. The shift operation may be represented by power of two factors as shown in equation (6). These powers of two factors ($n_i$ and $m_i$ in equation (6)) may be quantization interval dependent.

The device 315 may determine if the input value x is within the boundaries of the set of intervals I, exclusive the right boundary, as discussed with respect to equation (1). The set of intervals I may be the intervals during which the activation function exhibits non-linear behavior. In one or more embodiments, it may be assumed that the set of intervals I incorporates a set of non-uniform intervals, where i represents an interval in the set of intervals. In one or more embodiments, a subset of the MSBs of the input x is inputted to the device 315 because the non-uniform distribution of the intervals may be based on the most significant bits of the input quantized (e.g., x_msb), twos-complement encoded input value. For example, the 6 most significant input bits can be used to define the boundaries of 16 non-uniform intervals.

If the module 315 determines that the input x is within the boundaries of the set of intervals I, quadratic interpolation is performed to approximate the input x using the parameters of interval i that represents an interval in the set of intervals I.

The device 315 also determines the interval i from among the set of intervals I that includes the value of the input x.

Next, from device 320, the value of the parameters $a_i$, $b_i$, $c_i$ associated with the interval i that includes the input x (or input key x) are retrieved from a LUT to perform quadratic interpolation of input x based on equation (2) or equation (6). The LUT associated with the activation function may be stored in the device 320 or in another memory or storage unit of the AI accelerator or hard macro IP 300.

Once the parameters $a_i$, $b_i$, $c_i$ for performing quadratic interpolation of the input x are retrieved from the LUT, the multiplexer 330 may select the input of the multiplexer 330 that is connected to the output of the module 320 (e.g., when the quadratic interpolation is performed, there may not be any output from the module 325). The multiplexer 330 outputs the parameters $a_i$, $b_i$, $c_i$ from the module 320 and the multiply-accumulate-scale modules 335 and 340 performs quadratic interpolation of the input x based on the equations (5) and (6). For example, in one or more embodiments, the multiply-accumulate-scale module 335 may perform the operation $(b_i'+c_i \ d)$ as shown in equation (5) and the multiply-accumulate-scale module 340 may determine the value of the output y by multiplying the output from the multiply-accumulate-scale module 335 with "d" and then adding the result with the value of the parameter $a_i$.

In one or more embodiments, the output y may be shifted (e.g., see equation (6)) to ensure the intermediate and final values do not overflow and are of the desired quantization.

However, if the module 315 determines that the input x is not within the boundaries of the set of intervals I, for example, if the input value x is outside the quadratic interpolation ranges, i.e., x is in the ranges $[-\infty, l_0)$ and $[l_N, \infty]$, linear extrapolation is used to approximate the input x, using the equations (7) and (8).

In such a case, the device 325 determines the offset values $a_{min}$ and $a_{max}$ for the ranges $[-\infty, l_0)$ and $[l_{N+1}, \infty]$ of the input x, respectively, and the gradient or slopes balm and $b_{max}$ of the activation function for the ranges $[-\infty, l_0)$ and $[l_{N+1}, \infty]$, respectively.

Once the parameters $a_{min}$ or $a_{max}$ and $b_{min}$ or $b_{max}$ are determined, the multiplexer 330 outputs the parameters $a_{min}$ or $a_{max}$ and $b_{min}$ or $b_{max}$ and the multiply-accumulate-scale modules 335 and 340 perform linear interpolation of the input x based on the equations (9) and (10). For example, in one or more embodiments, the multiply-accumulate-scale module 335 may perform the operation $(b_{min}'(x-o_0))$ as shown in equation (9) or the operation $(b_{max}' \ (x-o_I))$ as shown in equation (10), and the multiply-accumulate-scale module 340 may determine the value of the output y by adding the output from the multiply-accumulate-scale module 335 with "$a_{min}$'" or "$a_{max}$'".

In one or more embodiments, the output y may be shifted (e.g., see equations (11) and (12)) to ensure the intermediate and final values do not overflow and are of the desired quantization.

FIG. 3B includes all the components of FIG. 3A, except the second multiply-accumulate-scale module 340. In FIG. 3B, the multiply-accumulate-scale module 335 performs all the calculations that were performed by the multiply-accumulate-scale modules 335 and 340 in FIG. 3A, for example, in two stages. For example, in the system of FIG. 3B, during the first round of calculation, the multiply-accumulate-scale module 335 may perform the calculations that were performed by the multiply-accumulate-scale module 335 of FIG. 3A. The output of the first round of calculations performed by the multiply-accumulate-scale module 335 are feed back to the multiply-accumulate-scale module 335 via the demultiplexer 345, and during the second round of operations, the multiply-accumulate-scale module 335 may perform the calculations that were performed by the multiply-accumulate-scale module 340 of FIG. 3A.

In other words, instead of having two multiply-accumulate-scale modules 335 and 340, as shown in FIG. 3A, only one of the multiply-accumulate-scale modules 335 and 340 may be re-used to perform all the calculation for approximation of the input x. For example, in the embodiment of FIG. 3B, after performing the first multiply-accumulate-scale operations by the multiply-accumulate-scale module 335, a first result is fed back to the multiply-accumulate-scale module 335 as input, via the demultiplexer 345. Then, a second multiply-accumulate-scale operation is performed by the module 335 based on the first result and the result of the second multiply-accumulate-scale operation may output as a second result via the demultiplexer 345, which may be the final result of the approximation of input x. In one or more embodiments, the demultiplexer 345 may select a first output port that is connected to the input of the multiply-accumulate-scale module 335, to output the first result, and the demultiplexer 345 may select a second output port that is connected to the input of the multiply-accumulate-scale module 335, to output the second result or the final result of the approximation of input x.

Figure 4:
FIGS. 4-6 illustrate example applications of the piece-wise approximation method discussed with respect to FIG. 2 according to some embodiments of the disclosure.

For example, in FIG. 4, quadratic interpolation is used to approximate the activation function tan h during the interval $[-8, 8)$ (where tan h exhibits non-linear behavior) using the method discussed with respect to FIG. 2. For example, the interval $[-8, 8)$ may be divided into a plurality of non-uniform intervals (e.g., the set of intervals I) and the input x may be approximated using a LUT incorporating the values of the parameters for each interval i of the set of intervals I using the equations (1) to (6). However, linear extrapolation is used to approximate the activation function tan h for the intervals $[-\infty, -8)$ and $[8, \infty]$ using the equations (7) to (12). In this case, the value of $a_{min}$' is $-1$ and the value of $a_{max}$' is $+1$. However, the values of both $b_{min}$' and $b_{max}$' may be zero.

Figure 5:
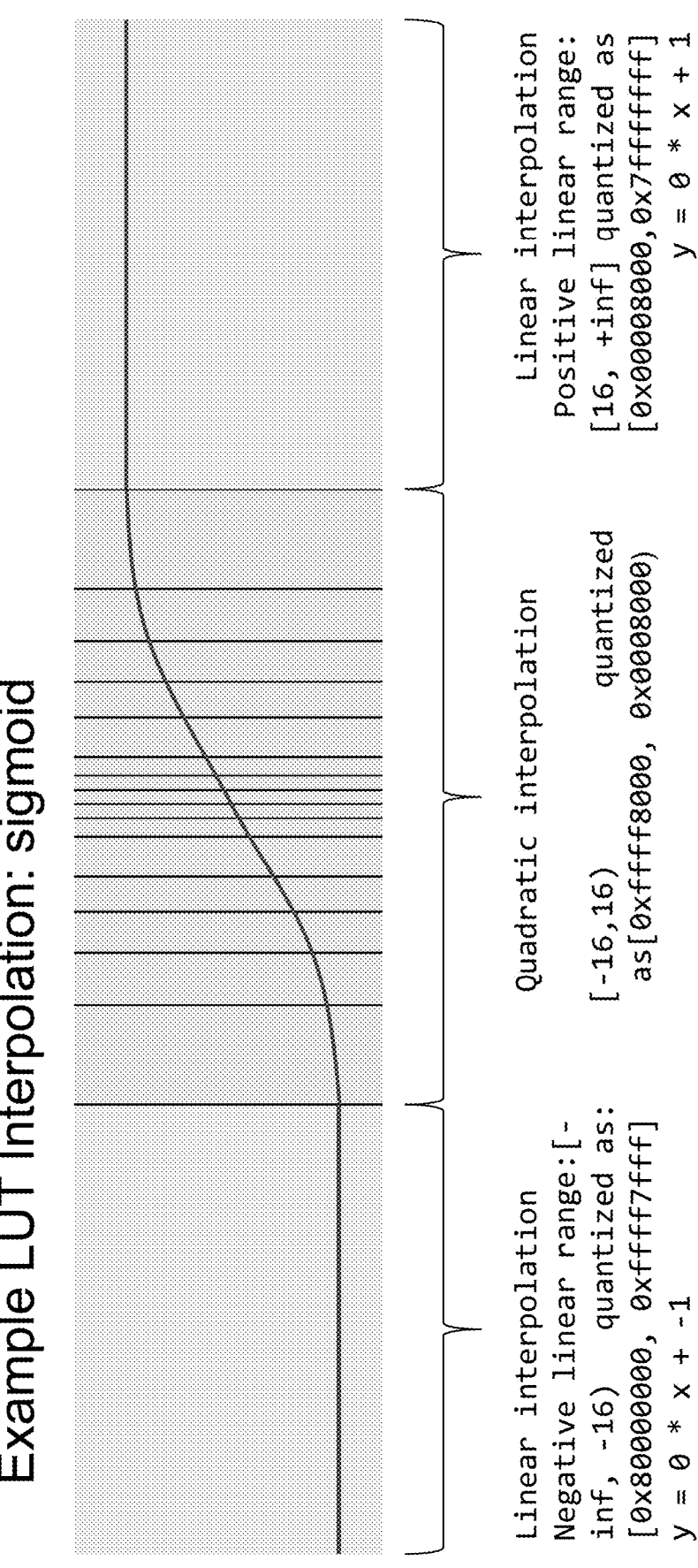

For example, in FIG. 5, quadratic interpolation is used to approximate the activation function sigmoid during the interval $[-16, 16)$ (where sigmoid exhibits non-linear behavior) using the method discussed with respect to FIG. 2. For example, the interval $[-16, 16)$ may be divided into a plurality of non-uniform intervals (e.g., the set of intervals I) and the input x may be approximated using a LUT incorporating the values of the parameters for each interval i of the set of intervals I using the equations (1) to (6). However, linear extrapolation is used to approximate the activation function sigmoid for the intervals $[-\infty, -16)$ and $[16, \infty]$ using the equations (7) to (12). In this case, the value of $a_{min}$' is $-1$ and the value of $a_{max}$' is $+1$. However, the values of both $b_{min}$' and $b_{max}$' may be zero.

Figure 6:

For example, in FIG. 6, quadratic interpolation is used to approximate the activation function swish during the interval $[-5, 3)$ (where swish exhibits non-linear behavior) using the method discussed with respect to FIG. 2. For example, the interval $[-5, 3)$ may be divided into a plurality of non-uniform intervals (e.g., the set of intervals I) and the input x may be approximated using a LUT incorporating the values of the parameters for each interval i of the set of intervals I using the equations (1) to (6). However, linear extrapolation is used to approximate the activation function swish for the intervals $[-\infty, -5)$ and $[3, \infty]$ using the equations (7) to (12). In this case, the value of $a_{min}$' is 0, the value of $a_{max}$' is 0, and the value of $b_{min}$' is also 0. However, the value of $b_{max}$' is variable in the interval $[3, \infty]$.

One or more embodiments of the present disclosure describe a piece-wise approximation method of the activation functions for AI/ML. In the approximation method of the present disclosure, quadratic interpolation is used to approximate the region or the interval (e.g., a non-linear interval) of the activation function that exhibit non-linear behavior, linear extrapolation is used for input values less than the smallest interval boundary and for input values greater than the largest interval boundary. In the approximation method of the present disclosure, the quadratic interpolation is used along with a look-up table (LUT) for fast and efficient calculation. In order to perform the quadratic interpolation to approximate the non-linear region of the activation function, the non-linear interval of the activation function is divided into non-uniform intervals to ensure limited look-up table sizes and efficient software and hardware implementation, as LUT may store the interpolation coefficient values for each of the limit values of the non-uniform intervals.

Figure 7:
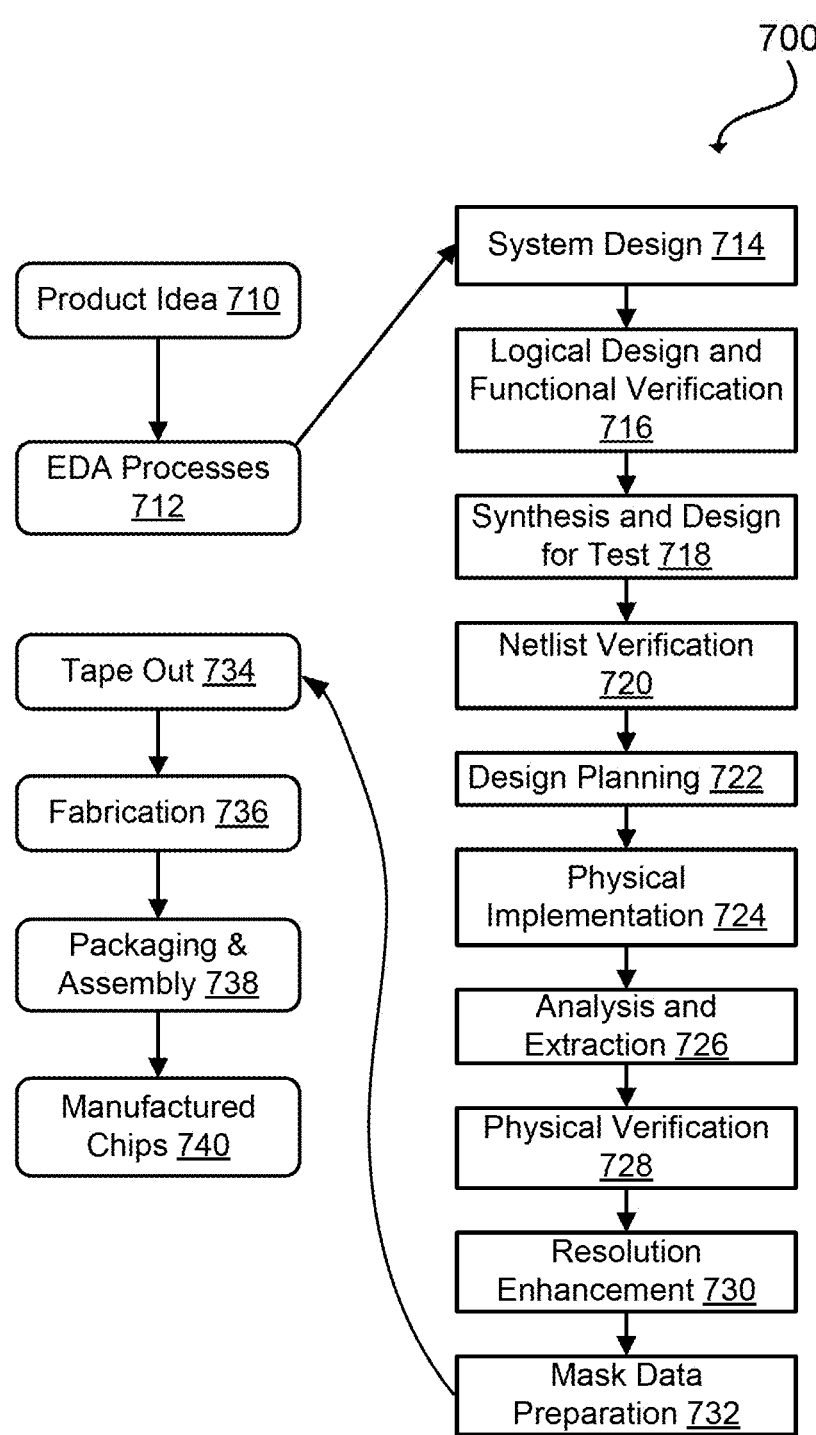
FIG. 7 depicts a flowchart of various processes used during the design and manufacture of an integrated circuit in accordance with some embodiments of the present disclosure.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, System Verilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 7. The processes described may be enabled by EDA products (or EDA systems).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 800 of FIG. 8) may be used to store the programs and data structures that are used by some or all of the EDA products described herein, and products used for development of cells for the library and for physical and logical design that use the library.

Figure 8:
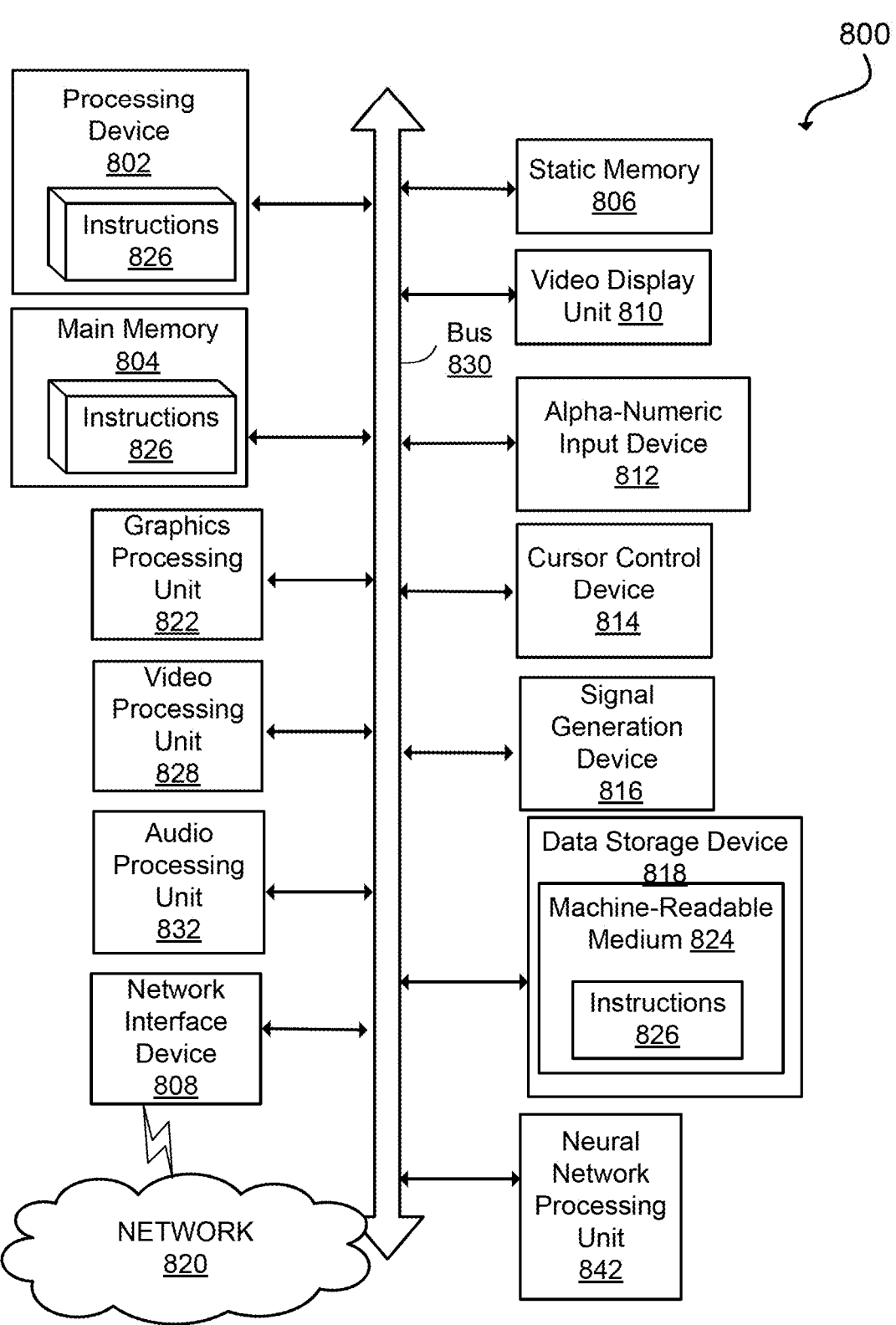
FIG. 8 depicts a diagram of an example computer system in which embodiments of the present disclosure may operate. For example, in one or more embodiments, the process of FIG. 7 may be performed in a neural network processing unit of FIG. 8 and the neural network processing unit of FIG. 8 includes the AI accelerator of FIGS. 3A-3B.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 908 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832. In one or more embodiments, the computer system 800 may also include a neural network processing unit 842. In one or more embodiments, the process of FIG. 7 may be performed in the neural network processing unit 842 and the neural network processing unit 842 may include the AI accelerator 300 of FIGS. 3A-3B.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

The detailed description set forth below in connection with the appended drawings is intended as a description of some example embodiments of a system and method for efficient look-up table based functions for an AI accelerator provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the scope of the present disclosure.

The terminology used herein is for the purpose of describing particular embodiments only and is not intended to be limiting of the present disclosure. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present disclosure refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method for approximating an activation function, the method comprising:

receiving an input value of the activation function;

determining, by a hardware accelerator, a range of input values that falls in a quadratic interpolation range of the activation function;

determining, by the hardware accelerator, whether the input value is within the quadratic interpolation range, wherein the quadratic interpolation range comprises a set of non-uniform intervals;

determining, by the hardware accelerator, a selected interval from among the set of non-uniform intervals comprising the input value;

based on determining that the input value is within the quadratic interpolation range:

retrieving, by the hardware accelerator, from a first look-up table (LUT) associated with a type of the activation function, values of one or more quadratic interpolation parameters associated with the selected interval;

performing a quadratic interpolation on the input value to approximate the input value using the values of the one or more quadratic interpolation parameters; and determining a first approximated output of the activation function based on a result of the quadratic interpolation performed on the input value, and based on determining that a second input value is outside the quadratic interpolation range, the hardware accelerator determines to perform a linear extrapolation in one or more linear extrapolation ranges comprising a range from an upper limit value of the quadratic interpolation range to positive infinity and a range from a lower limit value of the quadratic interpolation ranges to negative infinity by:

retrieving, by the hardware accelerator, from a second LUT, offset values and slopes of the activation function for each of the linear extrapolation ranges;

performing, by the hardware accelerator, the linear extrapolation on the second input value to approximate the activation function at the second input value using an offset value and a slope corresponding to the linear extrapolation range; and determining, by the hardware accelerator, a second approximated output of the activation function based on a result of the linear extrapolation performed on the second input value.

2. The method of claim 1, wherein a Remez minimax algorithm is used to determine a non-uniform distribution of the set of non-uniform intervals.

3. The method of claim 2, wherein the determining the selected interval from the set of non-uniform intervals is based on one or more of most significant bits (MSB) of the input value and two's complement encoded input value.

4. The method of claim 1, wherein the first LUT associated with the activation function comprises the values of the one or more quadratic interpolation parameters for each interval from among the set of non-uniform intervals.

5. The method of claim 4, wherein the hardware accelerator stores a plurality of LUTs comprising parameters associated with quadratic interpolation ranges of a plurality of activation functions.

6. The method of claim 5, wherein the plurality of LUTs are implemented as flip-flops in the hardware accelerator.

7. The method of claim 1, wherein:

the one or more linear extrapolation ranges do not overlap with the quadratic interpolation range.

8. The method of claim 7, wherein the input value is shifted by power of two factors within a range of representable values in a fixed point representation of the second approximated output of the activation function.

9. A system for approximating an activation function, the system comprising:

a bit shifter configured to receive an input value of the activation function and perform a shift operation on the input value to compute most significant bits (MSBs) of the input value, wherein the system is configured to determine a range of input values that falls in a quadratic interpolation range of the activation function;

a first device configured to determine if the input value is within the quadratic interpolation range comprising a set of non-uniform intervals, and determine a selected interval from among the set of non-uniform intervals comprising the input value based on the MSBs of the input value;

based on determining that the input value is within the quadratic interpolation range, a second device configured to retrieve from a look-up table (LUT) associated with the activation function, values of one or more quadratic interpolation parameters associated with the selected interval; and one or more multiply-accumulate-scale circuits configured to: perform a quadratic interpolation on the input value to approximate the input value using the values of the one or more quadratic interpolation parameters, and to determine a first approximated output of the activation function based on a result of the quadratic interpolation performed on the input value; and based on the first device determining that a second input value is outside the quadratic interpolation range, the one or more multiply-accumulate-scale circuits are further configured to perform a linear extrapolation in one or more linear extrapolation ranges comprising a range from an upper limit value of the quadratic interpolation range to positive infinity and in a range from a lower limit value of the quadratic interpolation ranges to negative infinity by:

performing the linear extrapolation on the second input value to approximate the activation function at the second input value using an offset value and a slope corresponding to a linear extrapolation range containing the second input value from among a plurality of offset values and slopes of the activation function for each of the linear extrapolation ranges, and determining a second approximated output of the activation function based on a result of the linear extrapolation performed on the second input value.

10. The system of claim 9, wherein the system comprises a hardware accelerator and/or an electronic circuit configured by a hard macro intellectual property (IP).

11. The system of claim 10, wherein the hardware accelerator stores a plurality of LUTs comprising parameters associated with quadratic interpolation ranges of a plurality of activation functions.

12. The system of claim 11, wherein the plurality of LUTs are implemented as flip-flops in the hardware accelerator.

13. The system of claim 9, wherein Remez minimax algorithm is used to determine non-uniform distribution of the set of non-uniform intervals.

14. The system of claim 13, wherein the determining the selected interval from among set of non-uniform intervals is based on one or more of most significant bits (MSB) of the input value and two's complement encoded input value.

15. The system of claim 9, wherein the LUT associated with the activation function comprises the values of the one or more quadratic interpolation parameters for each interval from among the set of non-uniform intervals.

16. The system of claim 9, further comprising:

a third device configured to determine the offset values and the slopes of the activation function for each of the one or more linear extrapolation ranges based on the first device determining that the second input value is within the one or more linear extrapolation ranges, the one or more linear extrapolation ranges do not overlap with the quadratic interpolation range.

17. The system of claim 16, wherein the input value is shifted by power of two factors within a range of representable values in a fixed point representation of the second approximated output of the activation function.

18. A non-transitory computer readable medium comprising stored representation of an accelerator circuit, which when synthesized by a processor, cause the processor to synthesize a structure of an electronic circuit configured to:

receive an input value of an activation function;

determining, by a hardware accelerator, a range of input values that falls in a quadratic interpolation range of the activation function;

determine, by the hardware accelerator, whether the input value is within the quadratic interpolation range, wherein the quadratic interpolation range comprises a set of non-uniform intervals;

determine, by the hardware accelerator, a selected interval from among the set of non-uniform intervals comprising the input value;

based on determining that the input value is within the quadratic interpolation range:

retrieve, by the hardware accelerator, from a look-up table (LUT) associated with the activation function, values of one or more quadratic interpolation parameters associated with the selected interval;

perform a quadratic interpolation on the input value to approximate the input value using the values of the one or more quadratic interpolation parameters; and determine a first approximated output of the activation function based on a result of the quadratic interpolation performed on the input value, and based on determining that a second input value is outside the quadratic interpolation range, the hardware accelerator determines to perform a linear extrapolation in one or more linear extrapolation ranges comprising a range from an upper limit value of the quadratic interpolation range to positive infinity and a range from a lower limit value of the quadratic interpolation ranges to negative infinity by:

determining, offset values and slopes of the activation function for each of the linear extrapolation ranges;

performing the linear extrapolation on the second input value to approximate the activation function at the second input value using an offset value and a slope corresponding to the linear extrapolation range; and determining a second approximated output of the activation function based on a result of the linear extrapolation performed on the second input value.

19. The non-transitory computer readable medium of claim 18, wherein the input value is shifted by power of two factors within a range of representable values in a fixed point representation of the first approximated output of the activation function.

20. The non-transitory computer readable medium of claim 18, wherein:

the one or more linear extrapolation ranges do not overlap with the quadratic interpolation range.

\* \* \* \* \*